United States Patent
Chai et al.

(10) Patent No.: US 6,480,662 B1
(45) Date of Patent: Nov. 12, 2002

(54) DESIGN OF A VARIABLE ATTENUATOR AND FABRICATION OF ITS SHUTTER ELEMENT

(75) Inventors: Stephen Chai, Santa Clara, CA (US); Alex Birman, Albany, CA (US); Nathan Shou, San Francisco, CA (US); Peter Jones, Albany, CA (US); Ho-Shang Lee, El Sobrante, CA (US)

(73) Assignee: Dicon Fiberoptics, Inc., Richmond, CA (US)

(*) Notice: Subject to any disclaimer, the term of this patent is extended or adjusted under 35 U.S.C. 154(b) by 0 days.

(21) Appl. No.: 09/493,816

(22) Filed: Jan. 28, 2000

(51) Int. Cl.$^7$ ................................................. G02B 6/26
(52) U.S. Cl. ........................ 385/140; 359/888; 385/34; 385/36
(58) Field of Search ........................... 385/15, 31, 33, 385/34, 48, 55, 73, 74, 140, 36; 359/738, 885, 888

(56) References Cited

U.S. PATENT DOCUMENTS

| | | | | |
|---|---|---|---|---|
| 4,904,044 A | * | 2/1990 | Tamulevich | 385/140 X |
| 4,989,938 A | * | 2/1991 | Tamulevich | 385/33 |
| 5,642,456 A | * | 6/1997 | Baker et al. | 385/140 |
| 6,068,592 A | * | 5/2000 | Davis | 600/132 |
| 6,130,984 A | * | 10/2000 | Shen et al. | 385/140 |
| 6,222,656 B1 | * | 4/2001 | Eu | 385/140 X |
| 6,404,970 B1 | * | 6/2002 | Gransden et al. | 385/140 |

OTHER PUBLICATIONS

"Electrostatically Balanced Comb Drive for Controlled Levitation," William C. Tang et al., pp. 198–202 (reprinted from *Technical Digest IEEE Solid–State Sensor and Actuator Workshop*, Jun. 1990, pp. 23–27).

"Electrostatic–Comb Drive of Lateral Polysilicon Resonators," William C. Tang et al., pp. 194–197 (reprinted from *Transducers ÷89, Proceedings of the 5th International Conference on Solid–State Sensors and Actuators and Eurosensors III*, Jun. 1990, pp. 328–331).

"Laterally Driven Polysilicon Resonant Microstructures," William C. Tang et al., pp. 187–193 (reprinted from *Proceedings IEEE Micro Electro Mechanical Systems*, Feb. 1989, pp. 53–59).

* cited by examiner

Primary Examiner—John D. Lee
(74) Attorney, Agent, or Firm—James S. Hsue; Skjerven Morrill LLP

(57) ABSTRACT

A variable attenuator employs a shutter element that is inserted into the path of a beam of radiation. The shutter element comprises a transparent substrate with an opaque layer formed on top of the substrate. The opaque layer forms a pattern in the shape of dots on one part of the substrate and in the shape of a solid layer with holes therein on another part of the substrate. The pattern of holes and dots are such that the radiation transmission function of the element varies as a smooth linear function with the length of the shutter element. Therefore, by inserting the shutter element in a direction along its length into the path of the radiation beam, the amount of attenuation of the beam can be accurately controlled.

15 Claims, 3 Drawing Sheets

DESIGN OF A VARIABLE ATTENUATOR AND FABRICATION OF ITS SHUTTER ELEMENT

BACKGROUND OF THE INVENTION

Fiber-optic networks are widely used to carry telecommunication transmissions. A simple fiber-optic network consists of a signal source, typically a laser, a network of fiber-optic cables to route the signal, and a receiver at the end of each branch. The receivers in fiber-optic networks are photodiodes and will only work properly for a certain range of optical signal power. Since power levels will vary in different branches of a network, the power must be controlled to keep the power in a particular branch in the operating range of the receivers. This can be done using variable attenuators.

Variable attenuators often function by blocking a portion of the optic signal. FIG. 1 shows a schematic of such a variable attenuator 100. An optical signal is carried by a fiber 101 embedded concentrically in a glass ferrule 102. The glass ferrule is attached to a Graded Index (GRIN) lens 103 which collimates the light and projects it in a beam 104. The attenuating element 105 blocks a fraction of the light, while the remainder is focused by a second GRIN lens 106 into another fiber 108 mounted concentrically in a glass ferrule 107.

The attenuation element 105 may typically have two different designs. The first type of attenuating element used was simply a solid shutter that was inserted into the beam 104. However, with such a device, the degree of attenuation is a non-linear function of the distance the element is inserted into the light beam. This makes it difficult to control the amount of attenuation. To improve upon this situation, a second type of shutter is used. In this case, the shutter element may be made from a transparent material coated with a layer of material of variable thickness, where the intensity of light transmitted through the layer of material varies with its thickness. By adjusting the profile of the thickness of the opaque material, the attenuation of the signal would vary linearly with the insertion displacement of the shutter element.

Even though the second type of conventional shutter is an improvement over the first type, it may be difficult to control the variable thickness of the coating so that the shutter has a light transmission that varies accurately with displacement. It may also be costly to fabricate a shutter element with a coating of variable thickness where the thickness of the coating must be controlled accurately. It is, therefore, desirable to provide an improved variable attenuator design which is less costly and easier to manufacture.

SUMMARY OF THE INVENTION

This invention is based on the observation that the process for fabricating the shutter element can be much simplified by forming a layer of opaque material on a transparent substrate, where the opaque layer forms a pattern so that the radiation transmission function of the opaque layer varies along a given direction, which is along a dimension of the shutter element. Preferably, the radiation transmission function of the opaque layer varies as a smooth linear function along the length of the shutter element. Then, by controlling the distance by which the shutter element is inserted into the path of the beam of radiation along the given direction, the amount of attenuation can be accurately controlled.

It is much easier to control the pattern formed by the opaque layer on the transparent substrate instead of controlling the thickness of a layer of material on the substrate. The cost of fabrication of the attenuator is, therefore, much reduced.

In a preferred embodiment, a large number of shutter elements may be formed at the same time on a large transparent substrate. After the pattern of the opaque layer has been formed at a number of locations of the transparent substrate, the substrate can be diced to form a large number of shutter elements. This further reduces the cost of fabrication of the shutter elements.

DETAILED DESCRIPTION OF THE PREFERRED EMBODIMENTS

The shutter element described makes use of a novel design to provide for variable transparency. The element is composed of a patterned metal film on a transparent substrate. The metal film is selectively removed over parts of the element to expose the transparent substrate. As more openings are made in the metal film, that region becomes more transparent. In the most transparent region, the metal film is almost entirely removed, leaving the transparent substrate clear except for widely spaced dots of metal.

Figure 1:
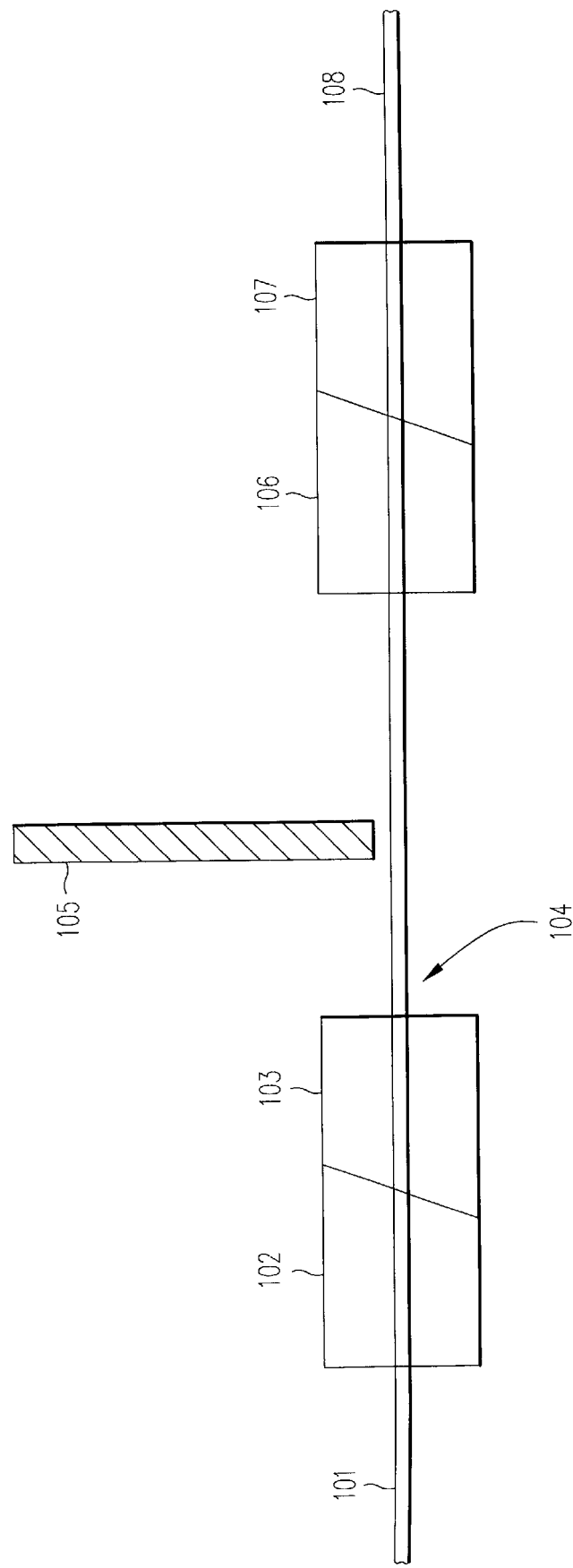
FIG. 1 is a schematic view of a conventional variable attenuator.
Figure 2:
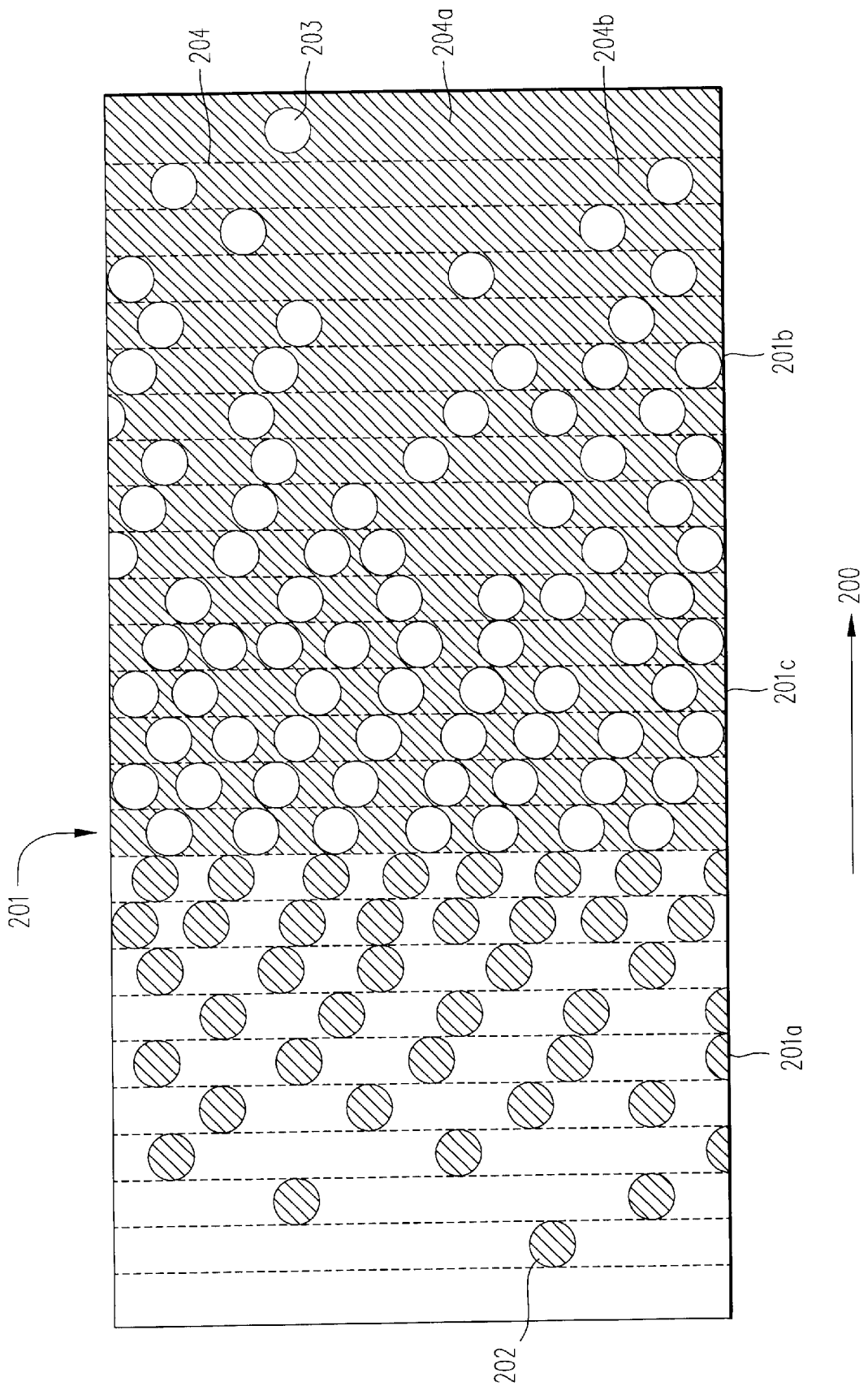
FIG. 2 is a front view of the shutter element of a variable attenuator to illustrate the preferred embodiment of the invention.

The shutter 201 is divided into a series of columns (FIG. 2), such as column 204a, 204b separated by an imaginary line 204. In the more transparent region 201a of the shutter, the columns contain a series of equally sized dots of metal 202, and the spacing between dots is preferably constant along each column. In each successive column along the direction 200, the spacing between the dots decreases to provide increasing attenuation. In the more opaque region 201b of the shutter 201, each of the columns contain a series of equally sized holes 203 in the metal, and the spacing between holes is preferably constant along each column. Each successive column has an increasing spacing between holes to provide increasing attenuation along direction 200, which is also along a length of shutter 201.

The dot separation or hole separation in each column can be adjusted to provide any attenuation profile as a function of shutter displacement, where the function is preferably smooth. However, a substantially linear attenuation profile is preferred.

The dots and holes may have any geometry, but are preferably 1 $\mu$m diameter circles. For shutters with a linear attenuation profile, the region with dots as features spans 1570 columns where the separation between dots may be as large as 754 $\mu$m in the first column and as small as 1 $\mu$m in the last column. The next 7430 columns have holes as the main features. The holes may be of arbitrary geometry, however 1 $\mu$m circular holes are preferably used. The column of holes in or next to the mid transparency region 201c is separated by 1 $\mu$m. The separation between holes increases along each successive column along direction 200, and a maximum separation which may be of the order of 53 $\mu$m is reached in the final column.

Figure 3:
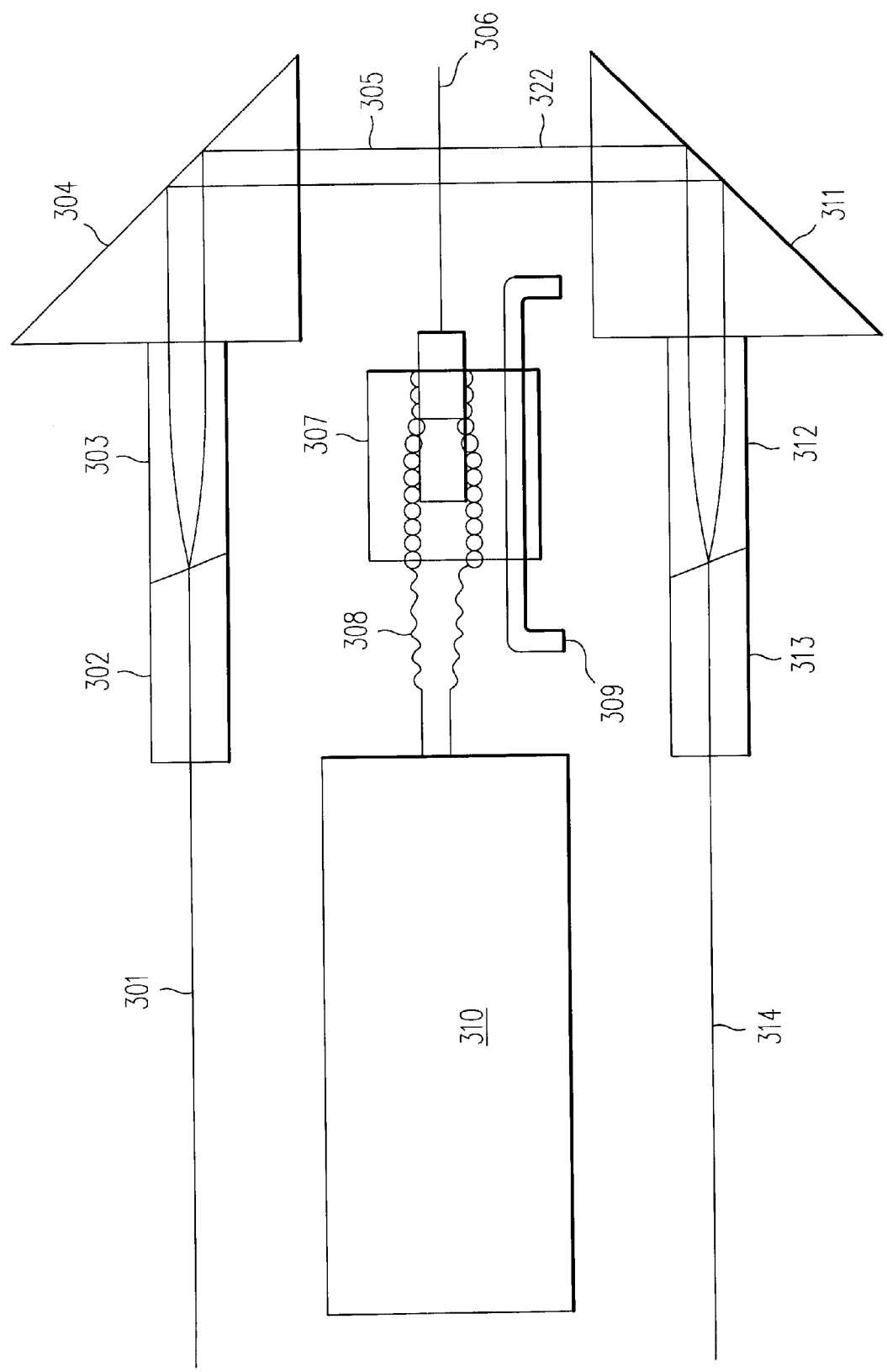
FIG. 3 is a schematic view of a variable attenuator to illustrate the preferred embodiment of the invention.

FIG. 3 shows the intended setup for the shutter element. The optical signal carried by a beam of radiation (such as light) is carried by a fiber 301 embedded in a glass ferrule 302 which is attached to a GRIN lens 303. The grin lens collimates the beam, and a right angle prism 304 deflects the radiation 90 degrees into beam 305. The radiation beam 305 is attenuated by the shutter element 306. Element 306 may have a construction similar to shutter 201 shown in FIG. 2.

The element insertion is controlled by a motor 310 which moves a nut 307 to which the shutter element 306 is attached. The motor 310 turns a screw 308 threaded into and advances the nut 307. The nut is prevented from rotation by a rail 309. The attenuated radiation beam 322 is again deflected 90 degrees by a right angle prism 311 and is focused by a GRIN lens 312 into another fiber 314 mounted concentrically in a glass ferrule 313.

Fabrication is done using photolithographic fabrication techniques commonly used in the semiconductor industry. These techniques permit the selective removal of a thin film of material deposited on a much thicker substrate. Starting with an optically transparent wafer (typically a quartz wafer 100 mm in diameter and 0.5 mm thick), a thin film of metal (such as aluminum) is sputtered onto the wafer. The metal film is then patterned by photolithography. This involves spinning on a layer of radiation-sensitive (e.g. light sensitive) material known as photoresist, exposing the portions of the photoresist to radiation according to the pattern defined on a photomask (such as that shown in FIG. 2), and developing the photoresist to remove the portions exposed to radiation. This process is capable of generating circular dots of photoresist as small as 1 $\mu$m in diameter, as well as circular holes in large regions of photoresist as small as 1 $\mu$m in diameter.

The wafer is then exposed to an etchant (can be a plasma etch, or possibly a wet, chemical etch) which removes the areas of metal not covered by photoresist. After the aluminum features have been defined, the photoresist is stripped off and the wafer is (diced) cut into individual elements. This permits a large number of "shutter elements" to be generated from a single wafer.

While the invention has been described above by reference to various embodiments, it will be understood that changes and modifications may be made without departing from the scope of the invention, which is to be defined only by the appended claims and their equivalents.

What is claimed is:

1. An optical attenuator comprising:
   an input optical path for an input beam of radiation;
   an output optical path receiving a beam of radiation from the input optical path;
   an optical element that transmits radiation, said element comprising a transparent substrate and an opaque layer thereon so that the radiation is transmitted only through areas of the substrate that are not covered by the opaque layer;
   an instrument moving said element along a direction that causes the beam to intercept a portion of the element interposed between the two paths, wherein the opaque layer forms a pattern such that intensity of radiation that is transmitted through the portion vanes with a dimension of the portion of the element along said direction, so that the amount of attenuation applied to the beam passing between the two paths is controllable by controlling the dimension of the portion of the element along said direction intercepted by the beam;
   wherein said pattern is in the form of an opaque layer with holes therein or an opaque layer in the form of dots, or both.

2. The attenuator of claim 1, said pattern being such that the element has a substantially smooth radiation transmittance function along said direction.

3. The attenuator of claim 2, said pattern being such that the element has a substantially linear radiation transmittance function.

4. The attenuator of claim 1, said pattern being in the form of an opaque layer with holes therein on one portion of the substrate and in the form of opaque dots on another portion of the substrate.

5. The attenuator of claim 4, wherein density of said holes increases along said direction, and density of said dots decreases along said direction.

6. The attenuator of claim 4, wherein the holes are of substantially the same size and the dots are of substantially the same size.

7. The attenuator of claim 1, wherein at least one of said optical paths comprises an optical fiber and a ferrule.

8. The attenuator of claim 1, wherein at least one of said optical paths comprises a GRIN lens.

9. The attenuator of claim 1, each of said optical paths comprises a prism, wherein the prism of said input optical path reflects said input beam towards the prism of the output optical path.

10. The attenuator of claim 9, wherein said element is placed between the prisms.

11. The attenuator of claim 1, wherein said instrument comprises a motor and a screw.

12. The attenuator of claim 11, said instrument comprising a nut attached to said element, said nut and said screw having complementary grooves.

13. A method for attenuating a beam of radiation, comprising:
    passing a beam of radiation from an input optical path to an output optical path;
    providing an optical element that transmits radiation, said element comprising a transparent substrate and an opaque layer thereon so that the radiation is transmitted only through areas of the substrate that are not covered by the opaque layer;
    turning a screw to displace a nut connected to the element relative to the beam moving said element along a direction that causes the beam to intercept a portion of the element interposed between the two paths, wherein the opaque layer forms a pattern such that intensity of radiation that is transmitted through the portion varies with a dimension of the portion of the element along said direction, so that the amount of attenuation applied to the beam passing between the two paths is controllable by controlling the dimension of the portion of the element along said direction intercepted by the beam;
    wherein said pattern is in the form of an opaque layer with holes therein or an opaque layer in the form of dots, or both.

14. A method for making an attenuator, comprising:
    forming a first layer of substantially opaque material on a transparent substrate;
    forming a second layer of radiation-sensitive material on the first layer;
    exposing the second layer to radiation to expose selected portions of the second layer according to a predetermined pattern;
    removing portions of the second layer that have been exposed to the radiation or portions of the second layer that have not been exposed to the radiation;
    assembling at least a portion of the first layer with the remaining portions of the second layer with optical components to form an attenuator.

15. The method of claim 14, further comprising dicing the first layer with the remaining portions of the second layer into individual shutter elements, wherein the assembling assembles one of the individual shutter elements with the optical components.

* * * * *